United States Patent
Hu et al.

(10) Patent No.: US 8,952,910 B2
(45) Date of Patent: Feb. 10, 2015

(54) TOUCHSCREEN SYSTEM

(75) Inventors: Zixia Hu, Sunnyvale, CA (US);
Songping Wu, Cupertino, CA (US);
Bike Xie, Sunnyvale, CA (US); Lun Dong, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 157 days.

(21) Appl. No.: 13/556,833

(22) Filed: Jul. 24, 2012

(65) Prior Publication Data
US 2013/0057506 A1  Mar. 7, 2013

Related U.S. Application Data

(60) Provisional application No. 61/530,362, filed on Sep. 1, 2011.

(51) Int. Cl.
*G06F 3/044* (2006.01)
*G06F 3/041* (2006.01)

(52) U.S. Cl.
CPC .............. *G06F 3/0416* (2013.01); *G06F 3/044* (2013.01)
USPC ........................................ 345/173

(58) Field of Classification Search
None
See application file for complete search history.

(56) References Cited

U.S. PATENT DOCUMENTS

| | | |
|---|---|---|
| 2006/0026521 A1 | 2/2006 | Hotelling et al. |
| 2010/0097342 A1 | 4/2010 | Simmons et al. |
| 2010/0193258 A1 | 8/2010 | Simmons et al. |
| 2010/0289759 A1 | 11/2010 | Fisher et al. |
| 2010/0295783 A1* | 11/2010 | El Dokor et al. ............. 345/158 |
| 2011/0147101 A1 | 6/2011 | Bateman et al. |
| 2011/0193817 A1* | 8/2011 | Byun et al. .................... 345/174 |

FOREIGN PATENT DOCUMENTS

| | | |
|---|---|---|
| EP | 2256598 | 12/2010 |
| WO | WO-2005114369 | 12/2005 |
| WO | WO-2009158065 | 12/2009 |
| WO | WO-2013032602 | 3/2013 |

OTHER PUBLICATIONS

"International Search Report and Written Opinion", PCT Application No. PCT/US2012/048070, Oct. 30, 2012, 16 pages.

* cited by examiner

*Primary Examiner* — Adam R Giesy

(57) ABSTRACT

This disclosure describes systems and techniques for implementing a touchscreen. These systems and/or techniques enable processing of a signal generated from one or more sensors of a touchscreen to reduce noise and increase accuracy.

20 Claims, 14 Drawing Sheets

TOUCHSCREEN SYSTEM

RELATED APPLICATION

This present disclosure claims priority to U.S. Provisional Patent Application Ser. No. 61/530,362, filed Sep. 1, 2011, the disclosure of which is incorporated by reference herein in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Touchscreens may be found in an ever-increasing variety of devices, such as mobile phones, tablets, desktop monitors, portable game devices, and so on. Touchscreens may include a display device and one or more sensors that are configured to detect proximity of an object to the display device. Conventional techniques utilized to process signals to detect proximity of an object to the display device, however, could suffer from inaccuracies due to noise encountered by the one or more sensors in detecting whether the object is present. These inaccuracies could diminish a user's experience with conventional touchscreens.

SUMMARY

This summary is provided to introduce subject matter that is further described below in the Detailed Description and Drawings. Accordingly, this Summary should not be considered to describe essential features nor used to limit the scope of the claimed subject matter.

A touchscreen system is described that includes an analog module configured to detect proximity of an object to a display device using one or more sensors, a hardware digital signal processor configured to process an output of the analog module using one or more algorithms, and a digital signal processor configured to implement software to process an output of the hardware digital signal processor to detect one or more touch behaviors.

A method is described that includes detecting proximity of an object to a display device using one or more sensors of an analog module, converting an output of the analog module into a digital signal by an analog-digital conversion module, processing the digital signal using one or more algorithms of a hardware digital signal processor, and detecting one or more touch behaviors from the processed digital signal by a digital signal processor using software.

An integrated hardware chip is described that includes a hardware digital signal processor configured to process a signal using one or more algorithms, the signal describing proximity of an object to a display device detected using one or more sensors and a digital signal processor configured to implement software to process an output of the hardware digital signal processor to detect one or more touch behaviors.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different instances in the description and the figures indicate similar or identical items.

DETAILED DESCRIPTION

Overview

Figure 1:
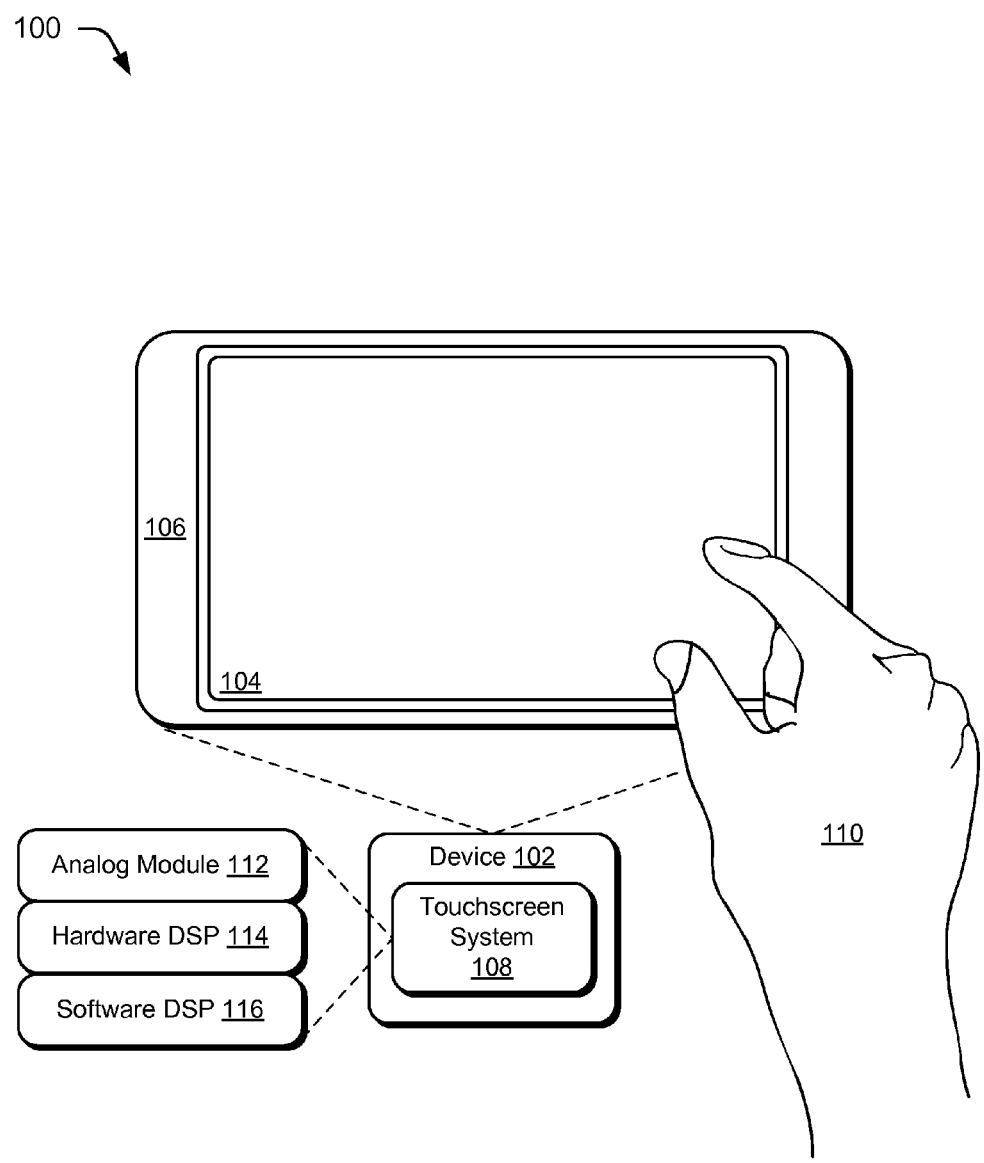
FIG. 1 illustrates an operating environment in which techniques involving a touchscreen system may be implemented.

This disclosure describes techniques including systems, and apparatuses for implementing touchscreens as well as processing of signals involved in detecting proximity of an object and identifying touch behaviors, e.g., gestures. These techniques may be used to increase accuracy in identifying touch behaviors by reducing noise and other inaccuracies that are part of the signal.

A touchscreen system, for example, may be partitioned into at least three parts, which may include an analog module, hardware digital signal processor, and a software digital signal processor. The analog module may include a display device as well as one or more sensors that are utilized to detect proximity of an object, e.g., capacitive sensors configured to detect a finger of a user's hand. An analog signal (e.g., an analog capacitance waveform) may then be converted into digital capacitance samples for processing by a hardware digital signal processor.

The hardware digital signal processor may employ one or more algorithms. For example, an algorithm may be used to adaptively calibrate voltage drift of the one or more sensors, further discussion of which may be found in relation to FIG. 4 and elsewhere. In another example, filtering and grouping may be used to increase detection sensitivity to detect the proximity of the object, further discussion of which may be found in relation to FIGS. 5 and 6. In a further example, an algorithm may be employed to determine an "on-state," further discussion of which may be found in relation to FIG. 7 and elsewhere. In yet a further example, voting and voting window techniques may be employed to process a signal, such as to reduce burst errors, further discussion of which may be found in relation to FIG. 9 and elsewhere. Another example involves generation of trace-tracking tables to describe location of respective objects in relation to the display device, further discussion of which may be found in relation to FIGS. 8-11 and elsewhere.

After processing by the hardware digital signal processor, another digital signal processor may be utilized that employs software to detect one or more touch behaviors, e.g., gestures, from an output of the hardware digital signal processor. These touch behaviors may then be exposed to other software of a computing device that employs the touchscreen system, further discussion of which may be found in relation to FIG. 12 and elsewhere.

In the discussion that follows, an operating environment having an example touchscreen system is first described, though this example system is not intended to limit the techniques or claims herein. Algorithms along with methods are then described, which may be employed in the system as well as by other systems. Following the discussion of the example algorithms and methods, an example apparatus is described. In the discussion below, reference will be made to the environment by way of example only and, therefore, implementations described below are not limited to the described environment.

Operating Environment

FIG. 1 illustrates an operating environment 100 having a device 102 that is configured to implement touchscreen functionality, which may be configured in a variety of ways. For example, the device 102 may be configured as a mobile device as illustrated (e.g., a mobile phone, tablet computer, portable game device) and therefore the touchscreen functionality may be implemented using a display device 104 disposed within a housing 106 of the device 102. In another example, the device 102 may be configured to interact with a traditional computer (e.g., a desktop personal computer, laptop computer, and so on) and therefore touchscreen functionality may be implemented by the device 102 through configuration as a stand-alone monitor and/or divided across the devices, e.g., a monitor and desktop computer. A variety of other examples are also contemplated, such as a television, wearable display device (e.g., watch), and so on. Thus, the device 102 may range from full-resource devices with substantial memory and processor resources (e.g., personal computers) to a low-resource device with limited memory and/or processing resources (e.g., wearable devices). The device 102 may also relate to software stored thereon that causes hardware of the device 102 to perform one or more operations.

The device 102 is illustrated as including a touchscreen system 108. The touchscreen system 108 of representative of functionality to detect and identify inputs using touchscreen functionality. Touchscreen functionality may include an ability to detect proximity of an object to the display device 104, such as a finger of a user's hand 110. The touchscreen system 108 may use a variety of sensors to detect this proximity, including capacitive, resistive, acoustic, strain sensors, and so on.

The detection of the proximity of the object may be utilized to support a variety of different functionality, such as object identification, gestures, and so on. For example, gestures may be recognized that may be used to initiate one or more operations of the device 102. Examples of gestures include a "tap" to select an item, a "zoom in" gesture, a "zoom out" gesture, and so forth. However, as previously described conventional touchscreen techniques could suffer from noise involved in the operation of the sensors during use and often relied on software applications themselves to identify touch behaviors. Thus, application developers using conventional touchscreen systems could be confronted with the complexity of both processing a potentially noisy input as well as to code software to identify touch behaviors.

Techniques, systems, and devices are described that involve a touchscreen system 108. These techniques may be utilized to reduce noise in a signal received from one or more sensors of a display device 104 (or other touch sensitive device such as a track pad) through partitioning of a touchscreen system 108, employing one or more algorithms to process signals received from the sensors, and/or identifying touch behaviors that may then be exposed to software of a device 102, e.g., one or more applications that are executed on the device 102.

The touchscreen system 108, for instance, is illustrated as being portioned into three parts. This includes an analog module 112, which may include sensors to detect proximity of an object, e.g., a "touch" of a finger of the user's hand 110. A hardware digital signal processor (DSP) 114 is also included and configured to process an output of the analog module 112. This may include use of one or more algorithms that are configured to reduce voltage drift of signals produced by the sensors, reduce noise, identify an on-state of one or more locations associated with the sensors, generate tracking tables describing locations of the detection of the object proximity, address burst errors encountered during detection, and so on as further described in relation to the following figure.

Figure 2:
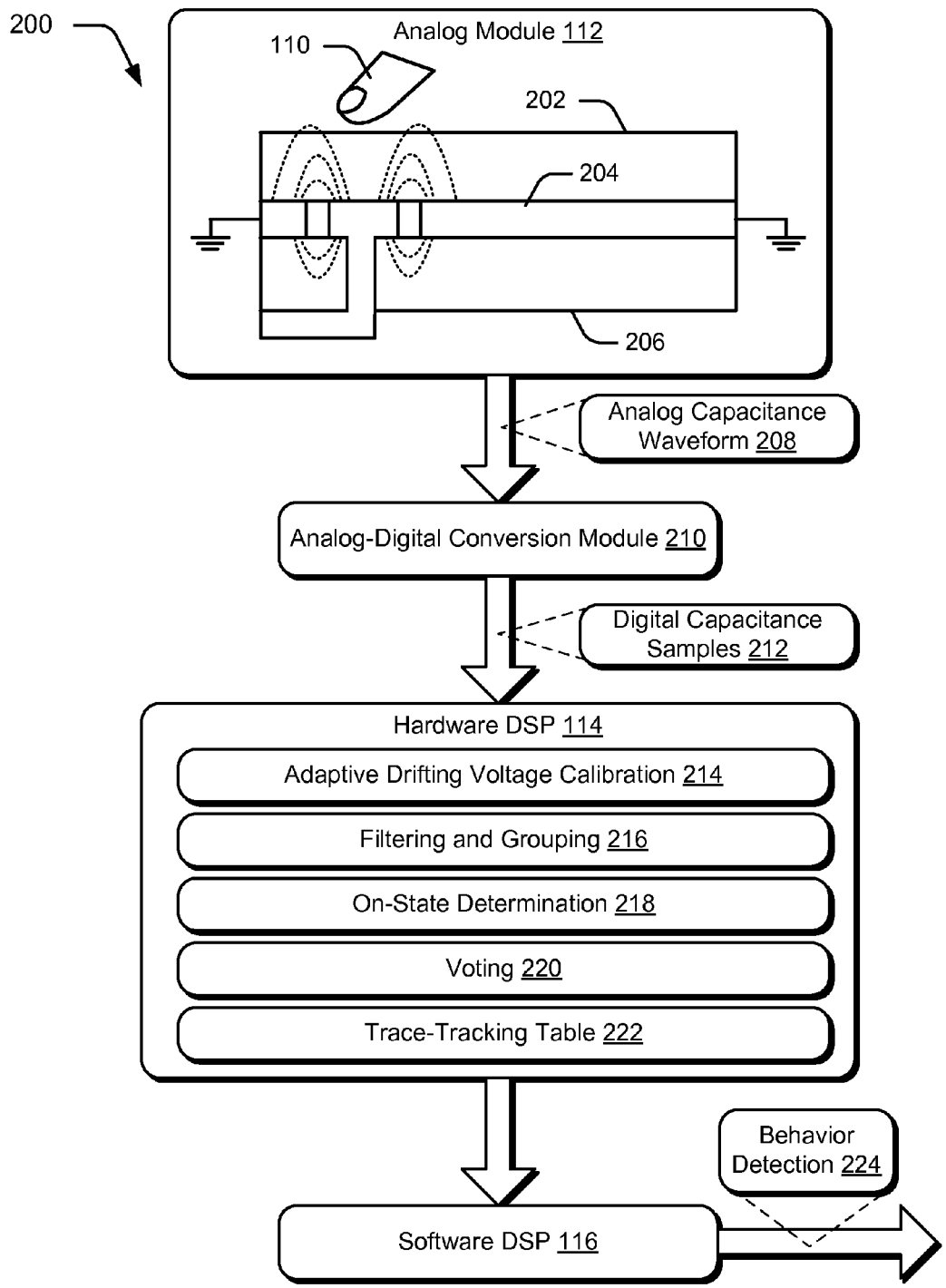
FIG. 2 is an illustration showing an example implementation of a touchscreen system of FIG. 1 in greater detail.

FIG. 2 is an illustration showing an example implementation 200 of the touchscreen system 108 of FIG. 1 in greater detail. The analog module 112 is illustrated as including a glass overlay 202, sensors 204 implemented with a layer, and a substrate 206, e.g., a printed circuit board, which may be implemented using a variety of materials, such as an FR-4 glass-reinforced epoxy laminate sheet. The sensors 204, for instance, may be configured as a grid (e.g., a grid of indium tin oxide) that utilizes scanning to determine proximity of an object (e.g., the finger of the user's hand 110) to a particular location, such as a location on the display device 104 of FIG. 1. As previously described other examples are also contemplated, such as to utilize copper in a track pad.

The analog module 112 as illustrated outputs an analog capacitance waveform 208 in this example that describes whether or not an object is proximal to one or more of the sensors 204. The analog capacitance waveform 208 may then be processed by an analog-digital conversion module 210 to generate digital capacitance samples 212. The digital capacitance samples 212 are then output to the hardware DSP 114.

The hardware DSP 114 may be configured to implement one or more algorithms to process the digital capacitance samples 212. The hardware DSP 114, for instance, may be implemented using hardware and not using software (e.g., fixed logic circuitry) although other instances are also contemplated in which software is executed. Examples of algorithms that may be implemented by the hardware DSP 114 include adaptive drifting voltage calibration 214 (as further described in relation to FIG. 4), filtering and grouping 216 (as further described in relation to FIGS. 5 and 6), on-state determination 218 (as further described in relation to FIG. 7), voting 220 (as further described in relation to FIG. 9), and trace-tracking tables 222 as further described in relation to FIGS. 8-11.

A result of the use of the algorithms is then output to the software DSP 116. The software DSP 116 may execute software to detect behaviors in the output received from the hardware DSP 114. This may include behaviors that are indicative of gestures to initiate one or more operations of the device 102. For example, the detected behaviors may include a "long click," rotation, a zoom gesture, and so on as further described in relation to FIG. 12. A result of the behavior detection 224 may then be exposed by the software DSP 116, such as to software (e.g., applications) that is executed on the device 102.

Through portioning of the touchscreen system 108 as shown in FIG. 2, the hardware DSP 114 may be utilized to reduce influence of noise on detection of proximity of an object, e.g., the finger of the user's hand 110. Additionally, the software DSP 116 may be utilized to perform and then expose behavior detection 224 to software of the device 102 or other devices, e.g., a computing device communicatively coupled to a monitor that implements the touchscreen system 108. In this way, the software may be coded without the complexity of coding for behavior detection 224.

Figure 3:
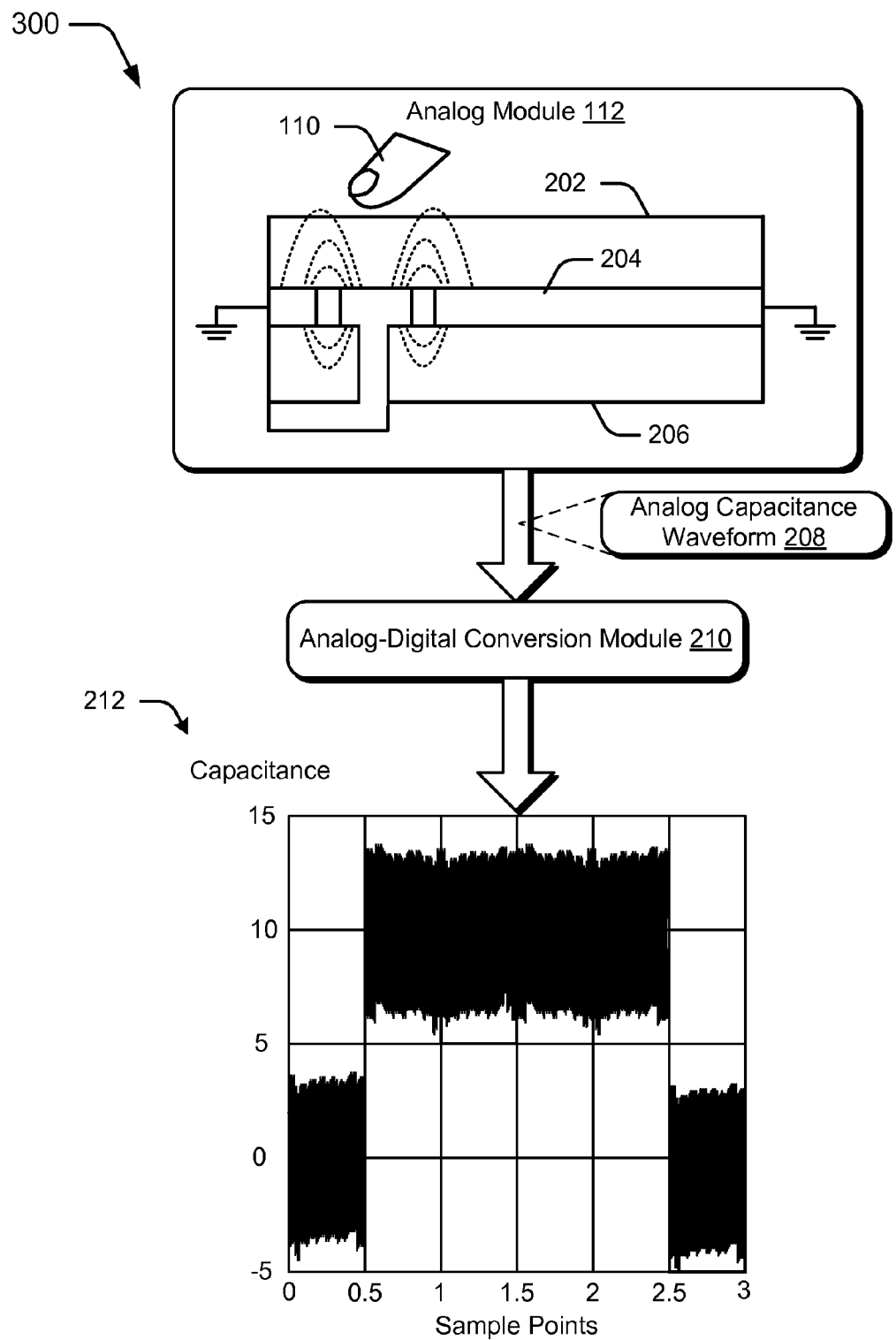
FIG. 3 depicts an example of operation of an analog-digital conversion module of FIG. 2 to produce digital capacitance samples.

FIG. 3 depicts an example 300 of operation of the analog-digital conversion module 210 of FIG. 2 to produce digital capacitance samples 212. The analog-digital conversion module 210 may receive the analog capacitance waveform 208 from the analog module 112 as previously described. The analog-digital conversion module 210 may then take a plurality of samples at a corresponding plurality of different points in time to generate the digital capacitance samples 212.

In the illustrated example 300, the digital capacitance samples 212 are shown as a graph in which values for capacitance are plotted along a Y-axis at different sample points in time that are plotted along an X-axis. It should be readily apparent that the digital capacitance samples 212 may be represented in a variety of other ways. The digital capacitance samples 212 may then be output to the hardware DSP 114 for processing using one or more algorithms as further described below.

Figure 4:
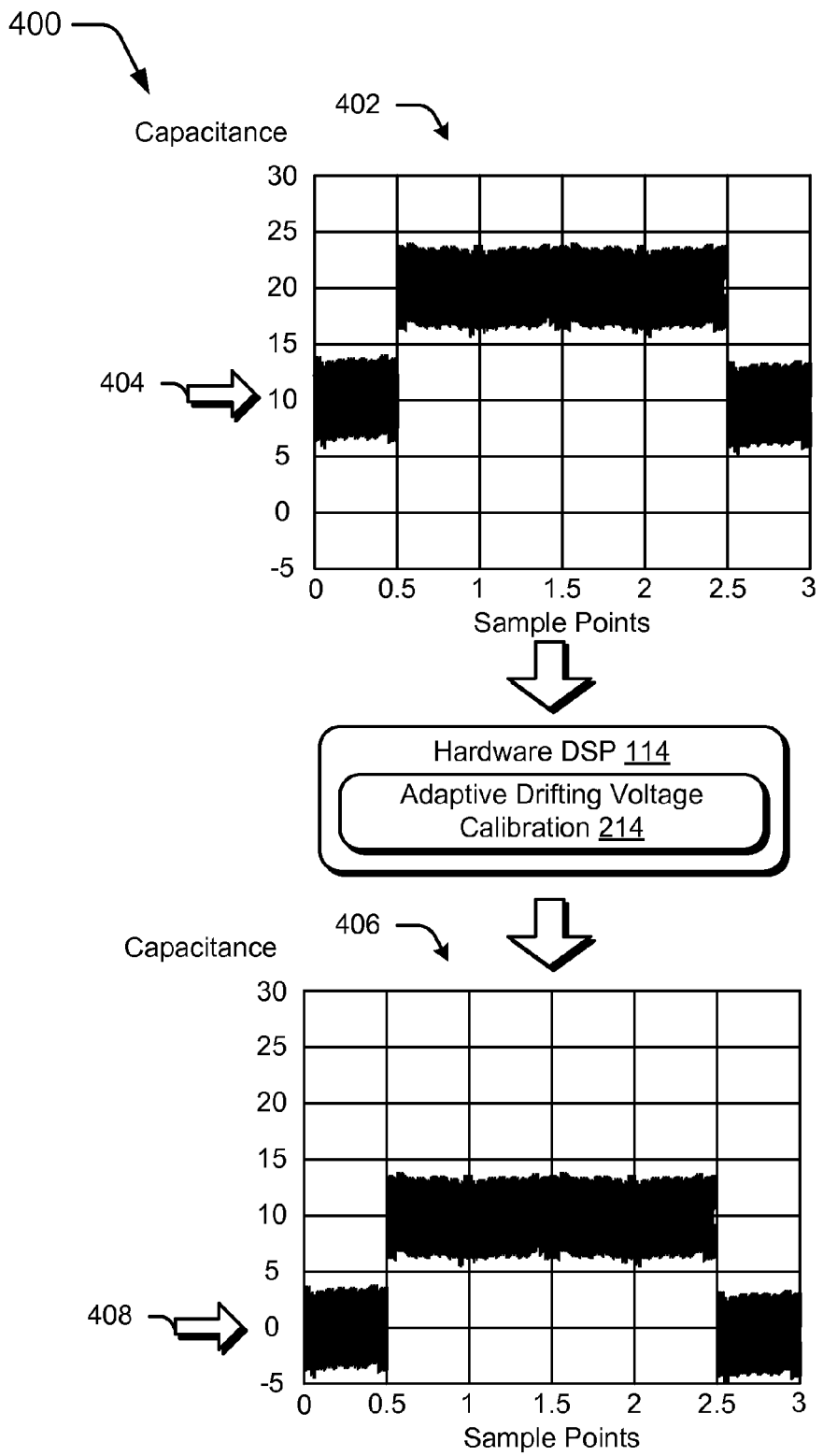
FIG. 4 depicts an example of operation of an adaptive drifting voltage calibration algorithm of FIG. 2 by a hardware digital signal processor (DSP).

FIG. 4 depicts an example 400 of operation of the adaptive drifting voltage calibration 214 algorithm of FIG. 2 by the hardware DSP 114. Digital capacitance samples 402 are shown as being received by the hardware DSP 114. The digital capacitance samples 402 at an interval between sample points 0.5 to 2.5 are illustrated as having greater capacitance than digital capacitance samples 402 between sample points at intervals 0.0 to 0.5 and 2.5 to 3. This may indicate that an object is proximal to a corresponding sensor at the interval between sample points 0.5 to 2.5. However, sensors and other parts of a circuit used to implement the analog module 112 may encounter noise due to a variety of factors, e.g., thermal noise. This may cause a threshold value for capacitance that was initially calibrated at zero to increase naturally, e.g., to a value 404 of ten as illustrated by the arrow for the digital capacitance samples 402. This may cause an erroneous indication that an object is proximal to one or more sensors.

However, the hardware DSP 114 may be configured to implement adaptive drifting voltage calibration 214 to calibrate a threshold value used to detect proximity of an object, e.g., a touch by a finger of the user's hand 110 of FIG. 1. A variety of different techniques may be used to perform this calibration.

The hardware DSP 114, for instance, may implement the adaptive drifting voltage calibration 214 to utilize a sliding window to estimate voltage drifting during a pre-defined period of time. This period of time may be chosen to correspond to a period of time in which it is likely that an object is not detected as proximal to the one or more sensors, e.g., through comparison with other samples in the illustrated range of 0.5 to 2.5. The adaptive drifting voltage calibration 214 algorithm may then be employed to determine an amount of drift.

The threshold may then be recalibrated by the hardware DSP 114 using a result of the adaptive drifting voltage calibration 214 algorithm. An example of this recalibration is shown in the digital capacitance samples 406 in which a value 408 of zero is illustrated by the arrow. The hardware DSP 114 may employ the adaptive drifting calibration 214 algorithm automatically at a variety of different points in time, such as at predefined intervals of time, responsive to a determination that capacitance values have exceeded a threshold, responsive to a determination of an inability to perform behavior detection, and so on.

In one or more implementations, the hardware DSP 115 may be configured to share registers to perform the adaptive drifting voltage calibration 214 algorithm to estimate drift for use as part of one or more of the other algorithms of the hardware DSP 114. In this way, resources of the hardware DSP 114 may be efficiently configured and utilized. Further, calculation of drift by the hardware DSP 114 may permit use of analog modules 112 that could otherwise not be used using conventional techniques. For example, a manufacturer may set specifications that could involve costly components. However, use of the hardware DSP 114 and adaptive drifting voltage calibration 214 may be used to support use of lower cost circuits and materials by reducing noise and increasing accuracy of the touchscreen system 108.

Figure 5:
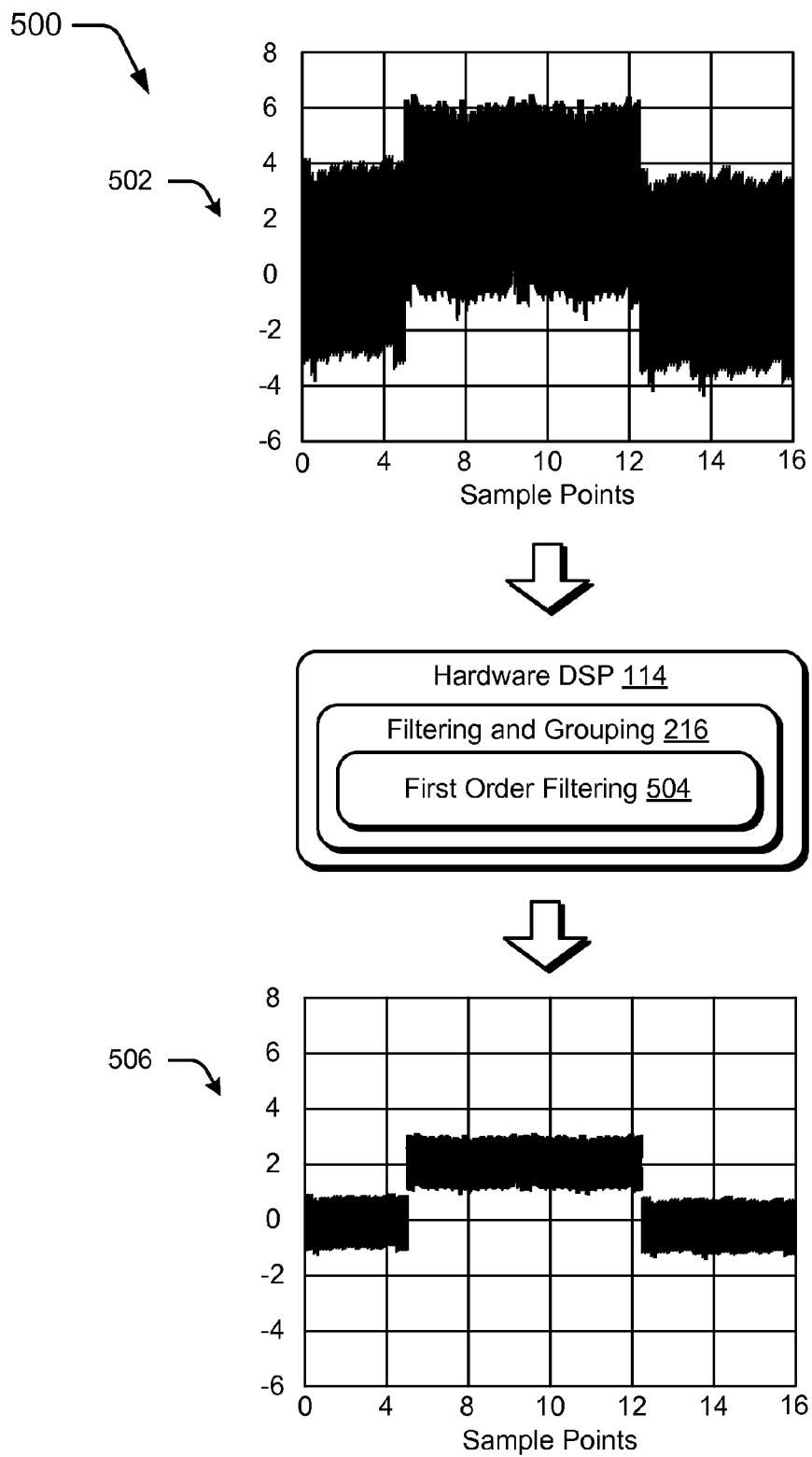
FIG. 5 depicts an example of operation of first-order filtering of a filtering and grouping algorithm of FIG. 2 by the hardware DSP.

FIG. 5 depicts an example 500 of operation of first-order filtering of the filtering and grouping 216 algorithm of FIG. 2 by the hardware DSP 114. As previously described, a touchscreen system 108 may detect proximity of an object using one or more sensors. This may be used for a variety of purposes, such as to press a representation of a button on the display device 104 of FIG. 1. However, noise encountered by a touchscreen system (e.g., thermal noise and so on) may have an effect on the sensitivity of the touchscreen system 108 in detecting when a user is pressing the button, such as due to a light touch that introduces a minimal amount of detectable capacitance. To address this, the hardware DSP 114 may employ filtering and grouping 216 algorithms to increase sensitivity of the touchscreen system 108 to differentiate between proximity of an object and a baseline noise level.

In the illustrated example 500, the hardware DSP 114 processes digital capacitance samples 502. These may be samples that may or may not be processed using the adaptive drifting voltage calibration 214 algorithm or other algorithms. The digital capacitance samples 502 have a range of about 6 volts in this sample. After processing by a first-order filtering 504 algorithm (e.g., infinite impulse response or "IIR" filtering) of the hardware DSP 114, digital capacitance samples 506 are produced that have a range that one-third less, which is about 2 volts in the illustrated example. In this way, a difference between sample points at interval 4-8 and intervals 0-4 and 12-16 is more-easily identified. It should be readily apparent that these values are but examples and a wide range of amounts of filters are contemplated. The hardware DSP 114 may then employ grouping of the filter and grouping 216 algorithm as further described below.

Figure 6:
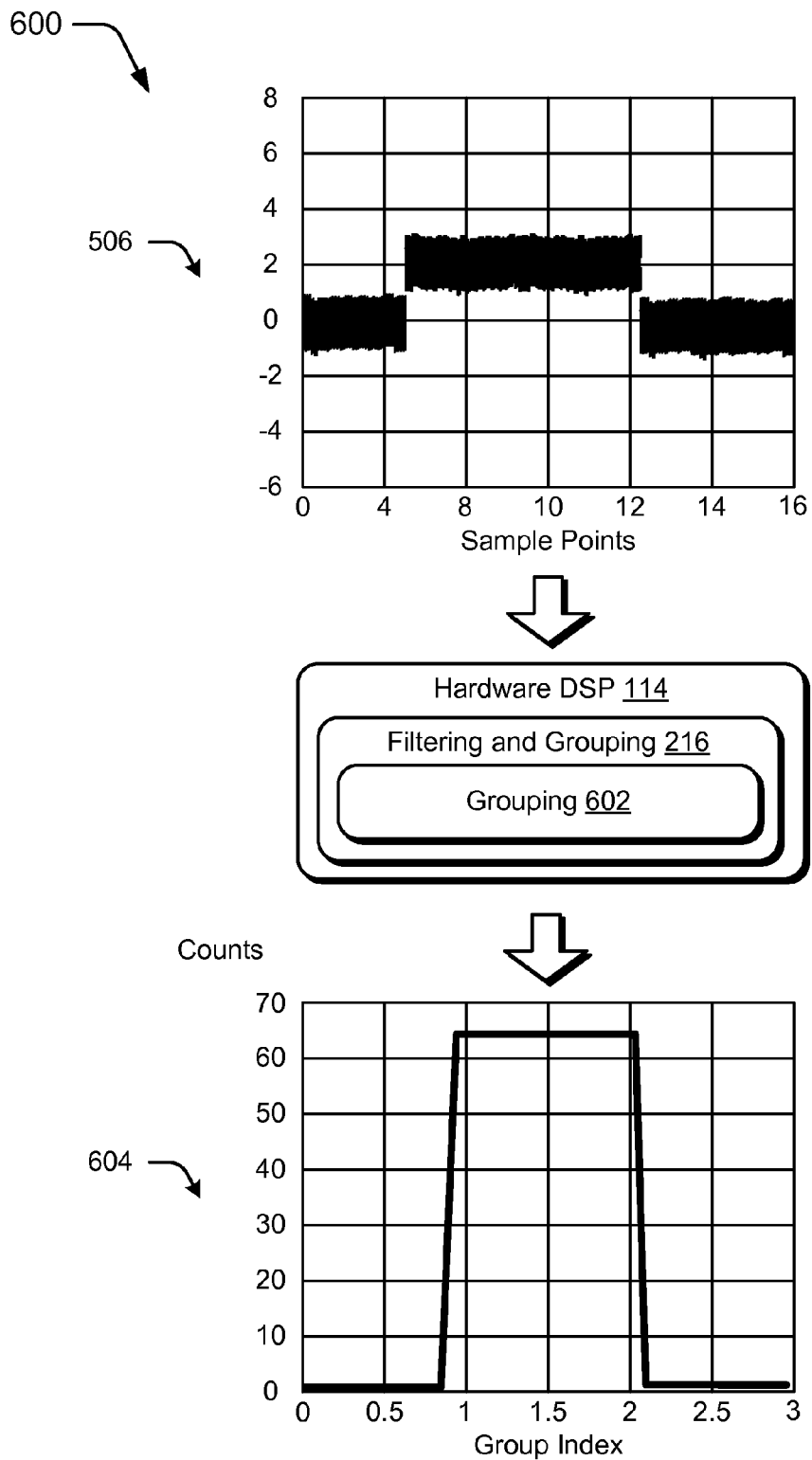
FIG. 6 depicts an example of operation of grouping of a filtering and grouping algorithm of FIG. 2 by the hardware DSP.

FIG. 6 depicts an example 600 of operation of grouping of the filtering and grouping 216 algorithm of FIG. 2 by the hardware DSP 114. In this example 600, the hardware DSP 114 processes a result of the first-order filtering 504 algorithm of FIG. 5, although other examples are also contemplated. As previously described, first-order filtering 504 may be used to reduce a range of the digital capacitance samples. Grouping may then be performed to further amplify differences between the samples.

The grouping 602 algorithm, for instance, may process the digital capacitance samples 506 using a group size "N" that is dependent on a sample clock frequency "$f_s$," as well as other system considerations of the device 102. This may include selecting N such that "$N/f_s$" is less than a coherence time in which capacitance is assumed flat within the duration. This may be used to produce samples 604 in which a group index is plotted against counts. In one or more examples, the grouping 602 algorithm employs a cumulative average sliding window, which calculates a cumulative value before averaging although other examples are also contemplated. Thus, sensitivity of the touchscreen system 108 to detection of proximity of an object (e.g., a finger of a user's hand 110 of FIG. 1) may be increased through use of the filtering and grouping 216 algorithm by the hardware DSP 114.

Figure 7:
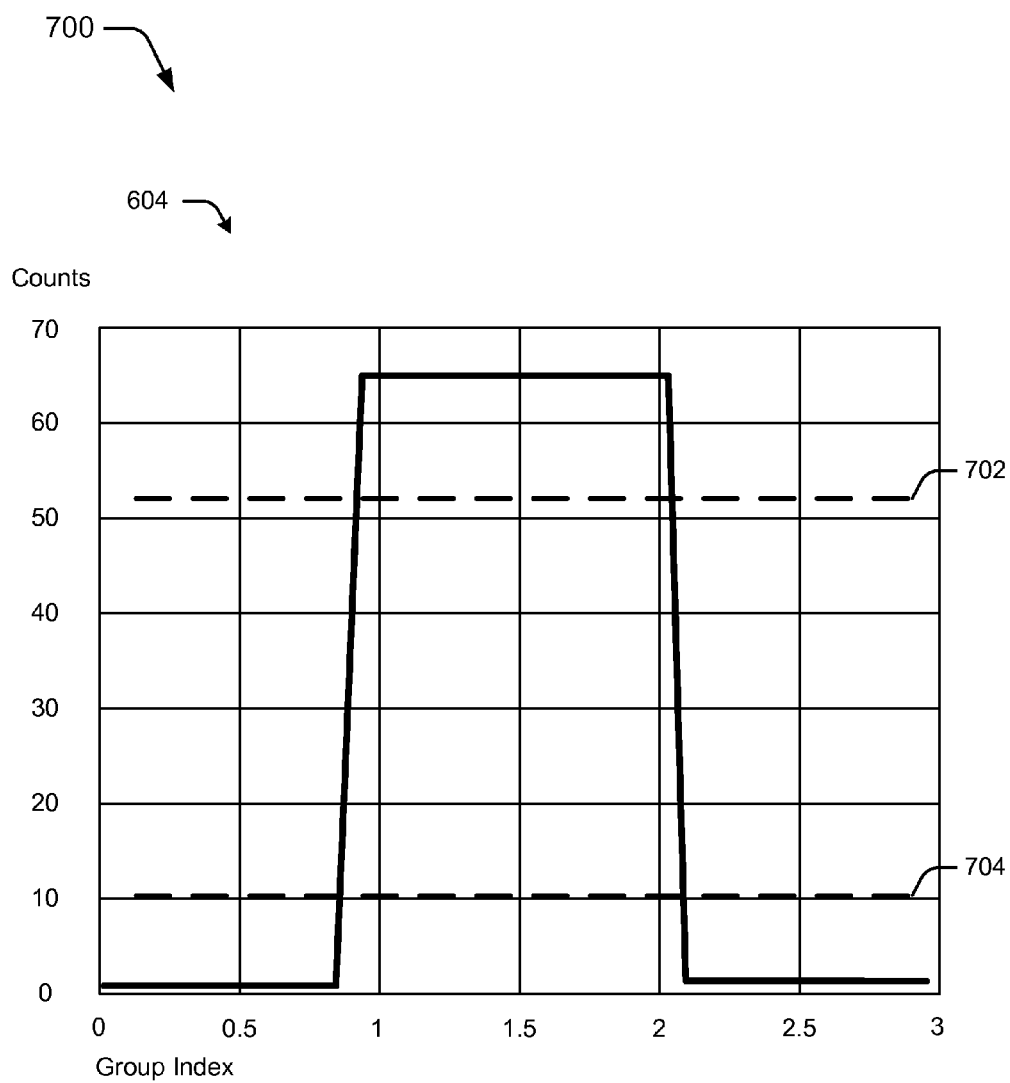
FIG. 7 depicts an example showing operation of an on-state determination algorithm of FIG. 2 by the hardware DSP.

FIG. 7 depicts an example 700 showing operation of the on-state determination 218 algorithm of FIG. 2 by the hardware DSP 114. In this example, samples 604 formed as a result of the filtering and grouping 216 algorithm are shown, although other examples are also contemplated. The on-state determination 218 algorithm 218 may be configured to employ a plurality of thresholds, examples of which include a detection threshold 702 and a noise threshold 704. These thresholds may be used to determine whether an object is considered to be detected at a position corresponding to particular sensors of the touchscreen system 108, such as a display of a button or other object.

The detection threshold 702, for instance, may be set for use in determining when a finger of the user's hand 110 of FIG. 1 or other object is to be considered proximal to the one or more sensors. Thus, values at the detection threshold 702 or greater (i.e., above the detection threshold 702) may indicate that a particular position associated with one or more sensors of the analog module 112 is considered "on," e.g., one or more coordinates in a capacitance grid detected during a scan.

The noise threshold 704 may be set for use in determining when the samples 604 are likely indicative of noise detected by the analog module 112. Thus, count values at or below the noise threshold 704 are not indicative of an "on state" of a corresponding location of the one or more sensors.

Both the detection threshold 702 and the noise threshold 704 may be used by the on-state determination 218 algorithm. For example, an "on-state" may be determined when a count number is detected that is above the detection threshold 702. This state may remain even upon encountering values below the detection threshold 702 but above the noise threshold 704. Thus, the on-state may remain until a count value is detected that is below the noise threshold 704. At that point in time, the location for the one or more sensors may be set to an "off-state."

Similar techniques may be employed for the off-state. For example, the off-state may be indicated when transferring from beneath the noise threshold 704 and up to points below but not exceeding the detection threshold 702. A transmission may then be made from the off-state to an on-state upon crossing the detection threshold 702. A variety of other examples of thresholds are also contemplated including use of thresholds having different values.

Figure 8:
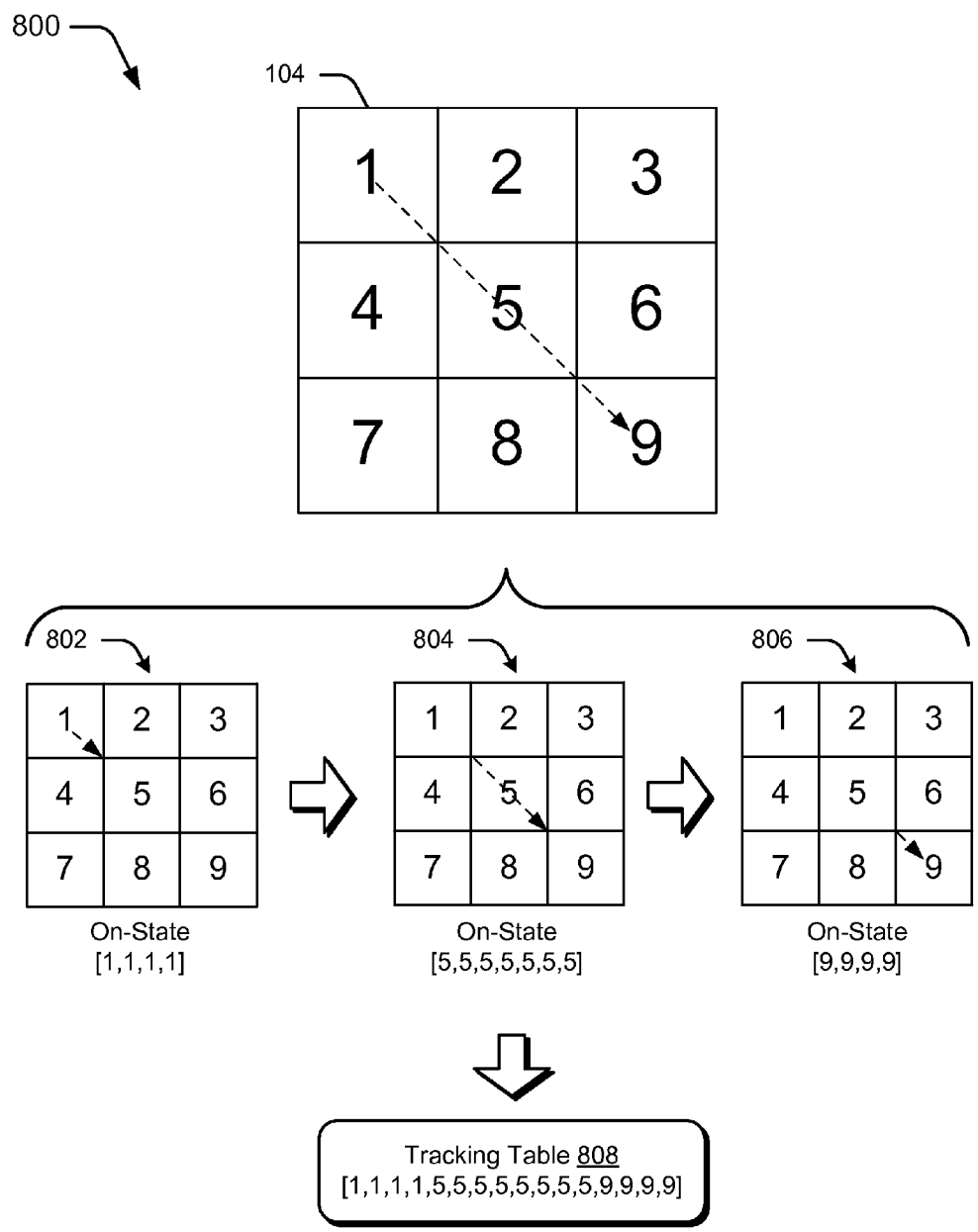
FIG. 8 depicts an example showing operation of a trace-tracking table algorithm of FIG. 2 by the hardware DSP.

FIG. 8 depicts an example 800 showing operation of the trace-tracking table 222 algorithm of FIG. 2 by the hardware DSP 114. In this example 800, the display device 104 is illustrated as displaying a numeric keypad having keys 1 through 9. Movement of an object proximal to the display device 108 is illustrated using a dashed arrow as beginning at key 1 and continuing through key 5 to end at key 9. The touchscreen system 108 may use the on-state determination 218 algorithm to determine when the particular keys are in the "on-state." These states may then be used by the trace-tracking table 222 algorithm to generate a trace tracking table that describes these states.

The trace-tracking table 222 algorithm, for instance, may determine that an on-state for a first period of time 802 that involves four scans by the analog module each correspond to key 1, which is determined to involve "[1,1,1,]." During a second period of time 804 that follows the first period of time 802, eight scans may be performed by the analog module 112, a result of which is determined to involve key 5, which is illustrated as "[5,5,5,5,5,5,5,5]." Finally, during a third period of time 806 that follows the second period of item 804, four scans may be performed by the analog module 112, a result of which is determined to involve key 9, which is illustrated as "[9,9,9,9]" in the example 900.

Accordingly, the trace-tracking table 222 algorithm may then generate a tracking table 808 for the movement of the object as proximal to the display device from the combination, which is illustrated as "[1,1,1,1,5,5,5,5,5,5,5,5,9,9,9,9]" in the example 800. In this way, the trace-tracking table 222 may provide a concise description of the movement of the object, which may then be analyzed for behavior determination as further described in relation to FIG. 12. Additionally, techniques may also be employed to remove an influence of errors from the tracking table 808, an example of which is described in relation to the following figure.

Figure 9:
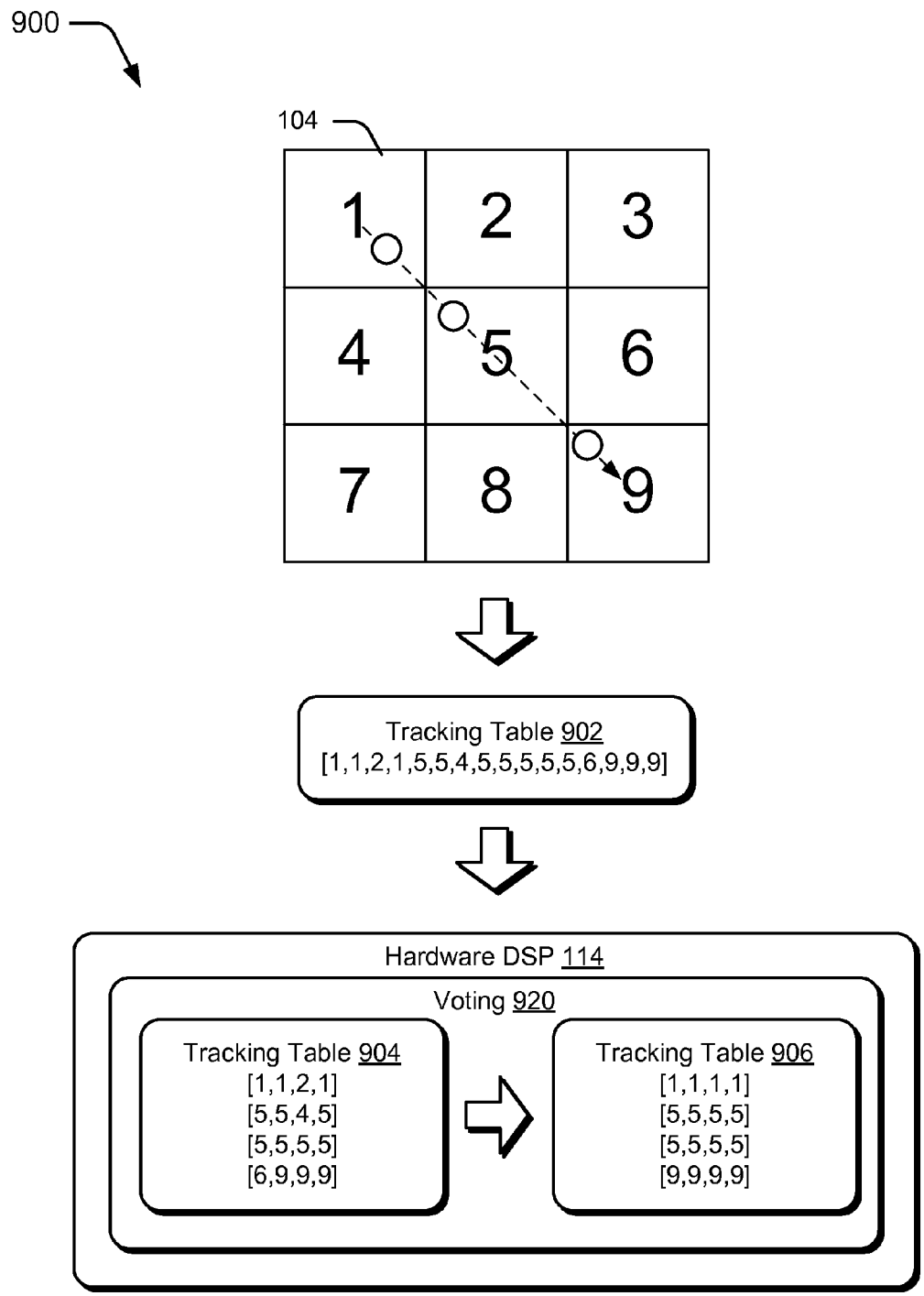
FIG. 9 depicts an example showing operation of a voting algorithm of FIG. 2 by the hardware DSP.

FIG. 9 depicts an example 900 showing operation of the voting 220 algorithm of FIG. 2 by the hardware DSP 114. As before, the display device 104 is illustrated as displaying a numeric keypad having keys 1 through 9, with movement of an object illustrated using a dashed arrow as beginning at key 1 and continuing through key 5 to end at key 9. On-states determined by the on-state algorithm are again used by the trace-tracking table 222 algorithm to generate a trace tracking table that describes these states. However, in this instance errors (e.g., burst errors) are encountered during the scanning, which are illustrated as circles along the path illustrated using the dashed arrow to indicate where the errors were encountered.

Accordingly, a tracking table 902 may be generated by the trace-track table 222 algorithm that describes the movement of the object as follows:

[1,1,2,1,5,5,4,5,5,5,5,5,6,9,9,9]

The hardware DSP 114 may then employ the voting 200 algorithm of FIG. 2 to remove the errors as follows. The voting 220 algorithm may first divide portions of the tracking table 902 into corresponding voting windows having a predefined length, examples of which are shown in the tracking table 904 in FIG. 9 as follows:

[1,1,2,1] [5,5,4,5] [5,5,5,5] [6,9,9,9]

Voting may then be performed within the plurality of windows to determine a vote that is to be used for values of the window. An example of a result from the voting for each of the plurality of windows is shown in the tracking table 906 of FIG. 9 as follows:

[1,1,1,1] [5,5,5,5] [5,5,5,5] [9,9,9,9]

As illustrated and shown above, the "2" in the first voting window has been changed to a "1" as a result of the voting. Likewise, a "4" in the second voting window has been changed to a "5." No changes were made to the third voting window as the results were unanimous. Finally, a "6" in the fourth voting window was changed to a "9" by the voting 220 algorithm. A variety of other error-correction techniques may also be employed by the hardware DSP 114 without departing from the spirit and scope thereof. In these examples, a single tracking table was generated to describe movement of a single object proximal to the display device 104. Other examples are also contemplated in which simultaneous movement of a plurality of objects may be described by the tracking tables, such as to support a multi-touch gesture, further description of which may be found in relation to the following figure.

Figure 10:
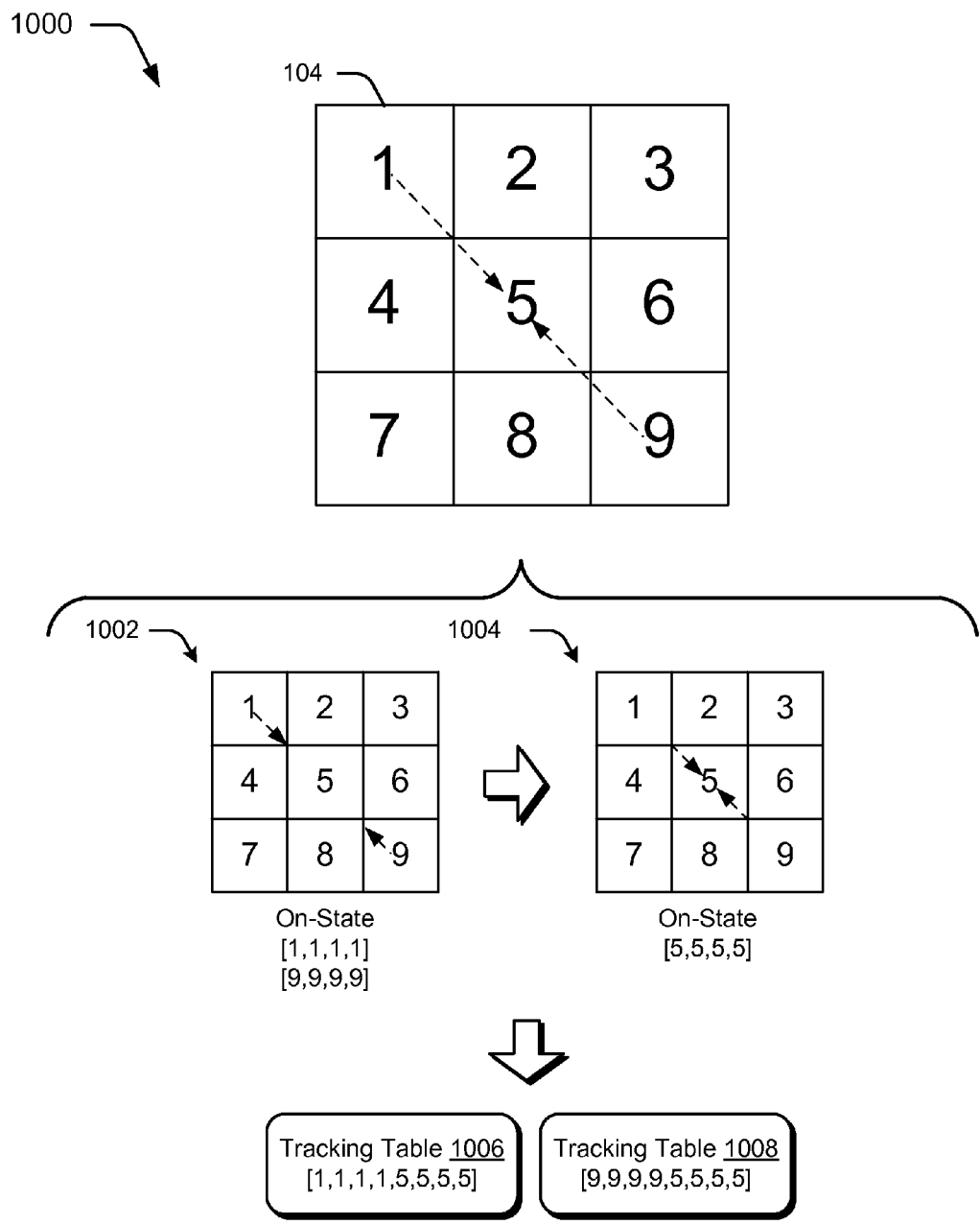
FIG. 10 depicts an example showing operation of a trace-tracking table algorithm of FIG. 2 by the hardware DSP to generate a plurality of tracking tables.

FIG. 10 depicts an example 1000 showing operation of the trace-tracking table 222 algorithm of FIG. 2 by the hardware DSP 114 to generate a plurality of tracking tables. As before, the display device 104 is illustrated as displaying a numeric keypad having keys 1 through 9. However, in this example 1000 simultaneous movement of a plurality of objects toward from each other is shown, such as in a "zoom-in" gesture. A first object (e.g., a finger of a user's hand) is moved from key 1 to key 5. A second object (e.g., another finger of the user's other hand) is moved from key 9 to key 5.

On-states determined by the on-state determination 218 algorithm are again used by the trace-tracking table 222 algorithm to generate a trace tracking table that describes these states for each of the objects. For example, for a first interval of item 1002 (e.g., four scans) an object may be detected as proximal to key 1 four times and another object may be detected as proximal to key 9 four times as illustrated to generate on-states of [1,1,1,1] and [9,9,9,9] for the respective keys. At a second interval of time, both objects may be detected as proximal to key 5 to generate on-states of [5,5,5,5] for that key.

Accordingly, the trace-tracking table 222 algorithm may generate a tracking table 1006 that describes movement of the first object as [1,1,1,1,5,5,5,5]. Additionally, the trace-tracking table 222 algorithm may also generating a tracking table 1008 that describes movement of the second object as [9,9,9, 9,5,5,5,5]. In this way, the touchscreen system 108 may support multi-touch gestures (e.g., a "zoom-in" in the illustrated example 1000) that may be identified as further described in relation to FIG. 12.

Figure 11:
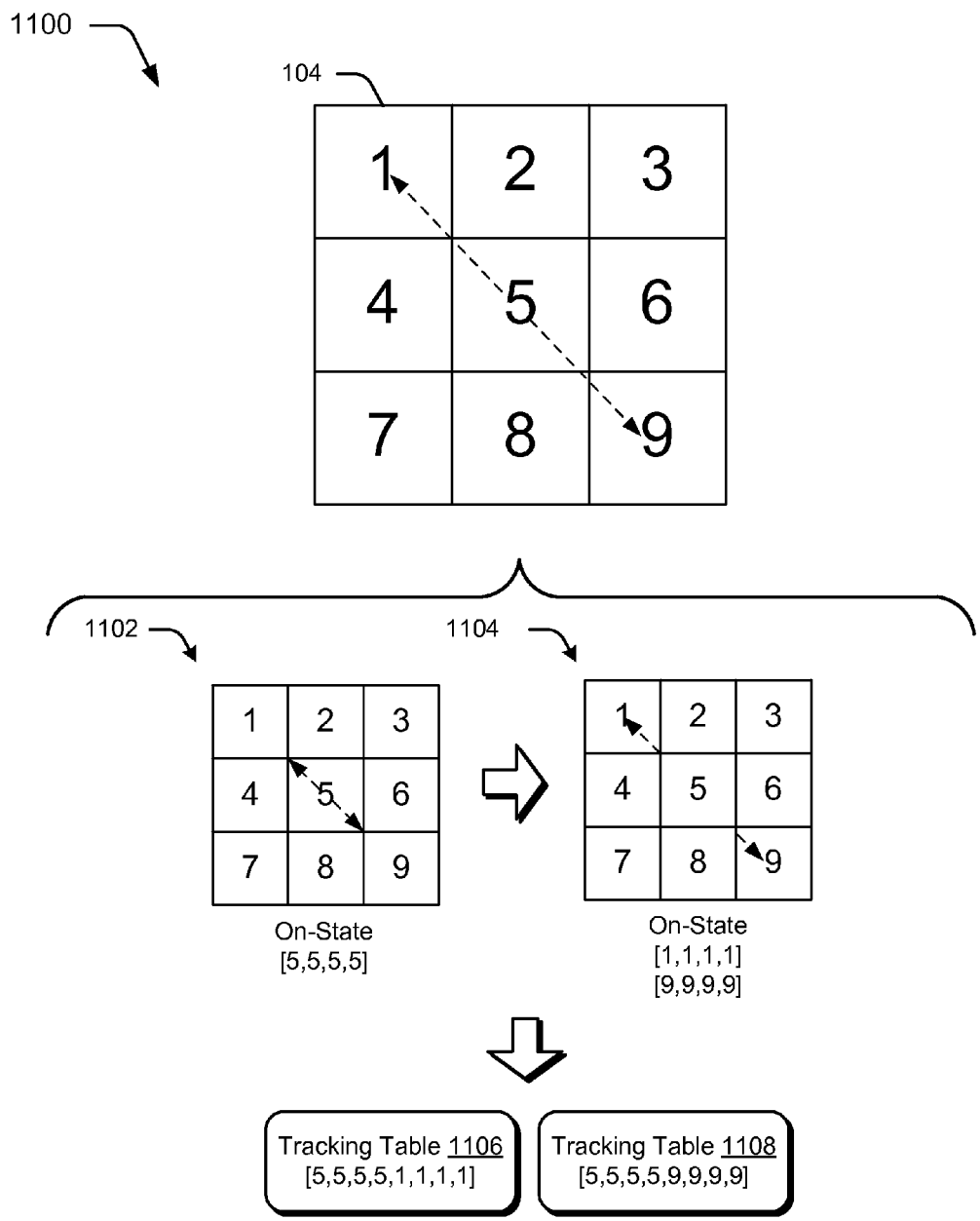
FIG. 11 depicts another example showing operation of a trace-tracking table algorithm of FIG. 2 by the hardware DSP to generate a plurality of tracking tables.

FIG. 11 depicts another example 1100 showing operation of the trace-tracking table 222 algorithm of FIG. 2 by the hardware DSP 114 to generate a plurality of tracking tables. As before, the display device 104 is illustrated as displaying a numeric keypad having keys 1 through 9. However, in this example 1100 simultaneous movement of a plurality of objects is shown away from each other, such as a "zoom out" gesture. A first object (e.g., a finger of a user's hand) is moved from key 5 to key 1. A second object (e.g., another finger of the user's other hand) is moved from key 5 to key 9.

On-states determined by the on-state determination 218 algorithm are again used by the trace-tracking table 222 algorithm to generate a trace tracking table for each of the objects. For example, for a first interval of item 1102 (e.g., four scans) both objects may be detected as proximal to key 5 to generate on-states of [5,5,5,5] for that key. At a second interval of time 1104, an object may be detected as proximal to key 5 four times and another object may be detected as proximal to key 9 four times as illustrated to generate on-states of [1,1,1,1] and [9,9,9,9] for the respective keys.

Accordingly, the trace-tracking table 222 algorithm may generate a tracking table 1106 that describes movement of the first object as [5,5,5,5,1,1,1,1]. Additionally, the trace-tracking table 222 algorithm may also generating a tracking table 1008 that describes movement of the second object as [5,5,5, 5,9,9,9,9]. Thus, in this example 1100 simultaneous movement of two objects may be described to support a multi-touch gesture, such as a zoom out gesture. The software DSP 116 may then process these trace-tracking tables to perform behavior detection 224, an example of which is described in relation to the following figure.

Figure 12:
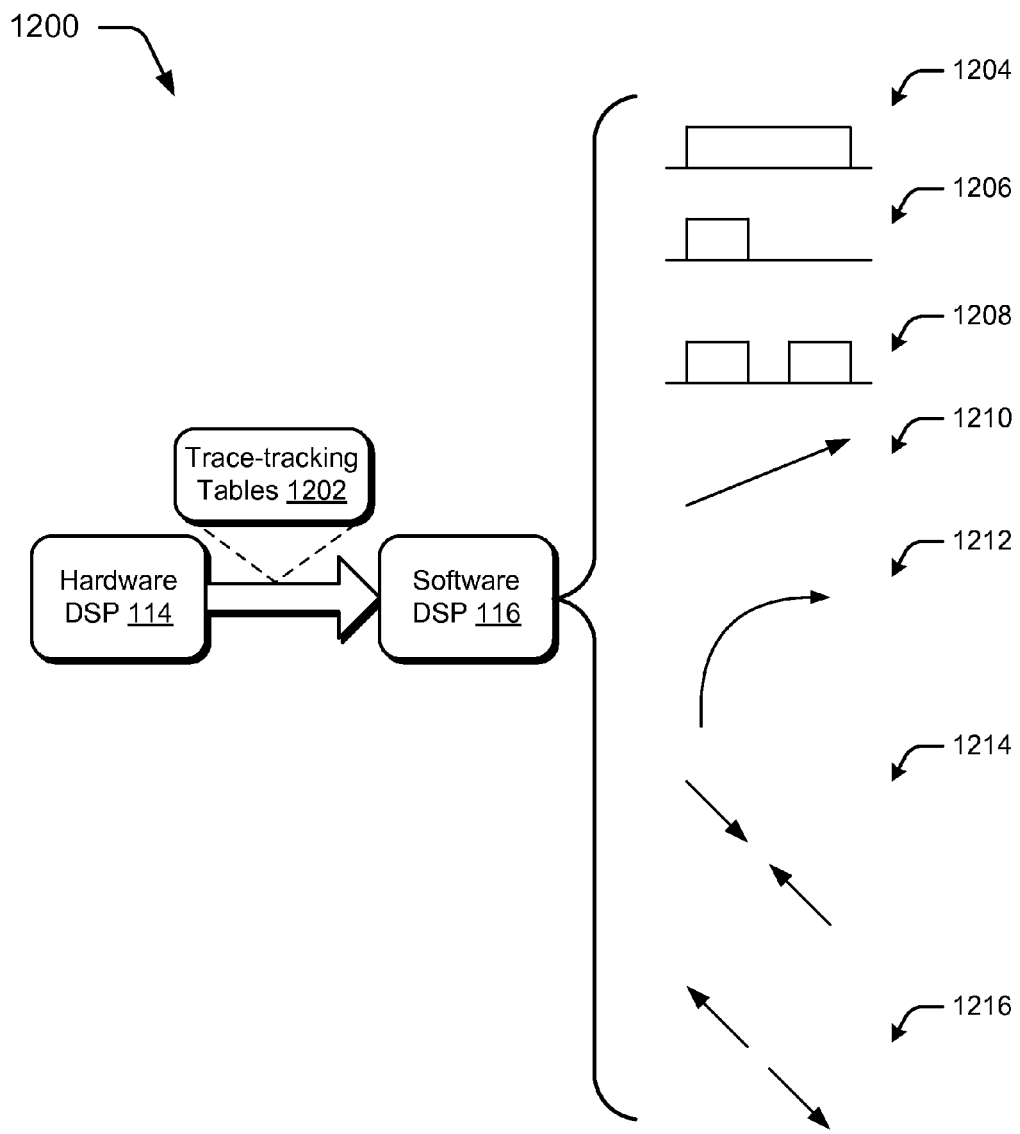
FIG. 12 depicts an example of a software DSP of FIG. 2 as performing one or more operations to perform behavior detection of an output of a hardware DSP.

FIG. 12 depicts an example 1200 of the software DSP 116 of FIG. 2 as performing one or more operations to perform behavior detection of an output of the hardware DSP 114. The software DSP 116 is illustrated as receiving one or more trace-tracking tables 1202 from the hardware DSP 114. The software DSP 116 may then perform behavior detection, which may be dependent on behavior properties and demands of software (e.g., applications executed by the device 102) that are to receive an output of the software DSP 116.

The software DSP 116, for instance, may process the trace-tracking tables 1202 to detect a long click 1204, short click 1206, double click 1208, movement 1210, rotation 1212, zoom out 1214, zoom in 1216, and so on. These behaviors may then be exposed to software that is to be affected by the behaviors, such as to initiate one or more operations of the device 102. In this way, the software may be developed without "knowing how" the underlying processing is performed. A variety of other examples of gestures are also contemplated.

Figure 13:
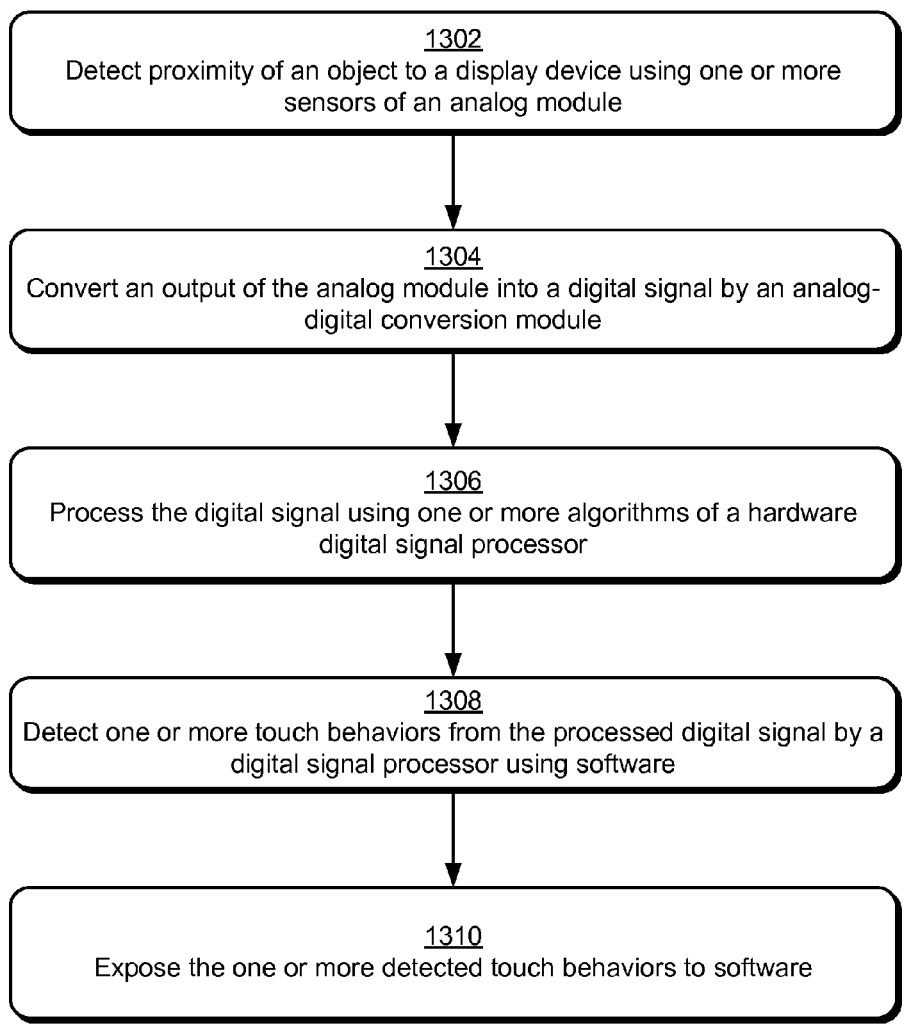
FIG. 13 is a flow diagram depicting an example method of operation of a touchscreen system

FIG. 13 illustrates an example method 1300 of operation of a touchscreen system.

At 1302, proximity of an object to a display device is detected using one or more sensors of an analog module. A finger of a user's hand 110, for instance, may be detected as proximal to the analog module 112 using one or more sensors as shown in FIG. 2. The sensors may take a variety of different forms as previously described, such as resistive, capacitive, and so on.

At 1304, an output of the analog module is converted into a digital signal by an analog-digital conversion module. The analog-digital conversion module 210 shown in FIG. 2 may convert an analog capacitance waveform 208 in this example into digital capacitance samples 212.

At 1306, the digital signal is processed using one or more algorithms of a hardware digital signal processor. The hardware DSP 114 of FIG. 2 is illustrated as including a plurality of different algorithms for implementation. Examples of algorithms include an adaptive drifting voltage calibration 214 algorithm, filtering and grouping 216 algorithm, an on-state determination 218 algorithm, a voting 220 algorithm, and a trace-tracking table 222 algorithm.

At 1308, one or more touch behaviors are detected from the processed digital signal by a digital signal processor using software. An output of the hardware DSP 114, for instance, may be processed by the software DSP 116. This processing may be used to perform behavior detection, examples of which are shown in FIG. 12.

At 1310, the one or more detected touch behaviors are exposed to software. The software DSP 116, for instance, may expose a result of the behavior detection 224 to software that is executable by the device 102, such as one or more applications.

Example System-On-Chip

Figure 14:
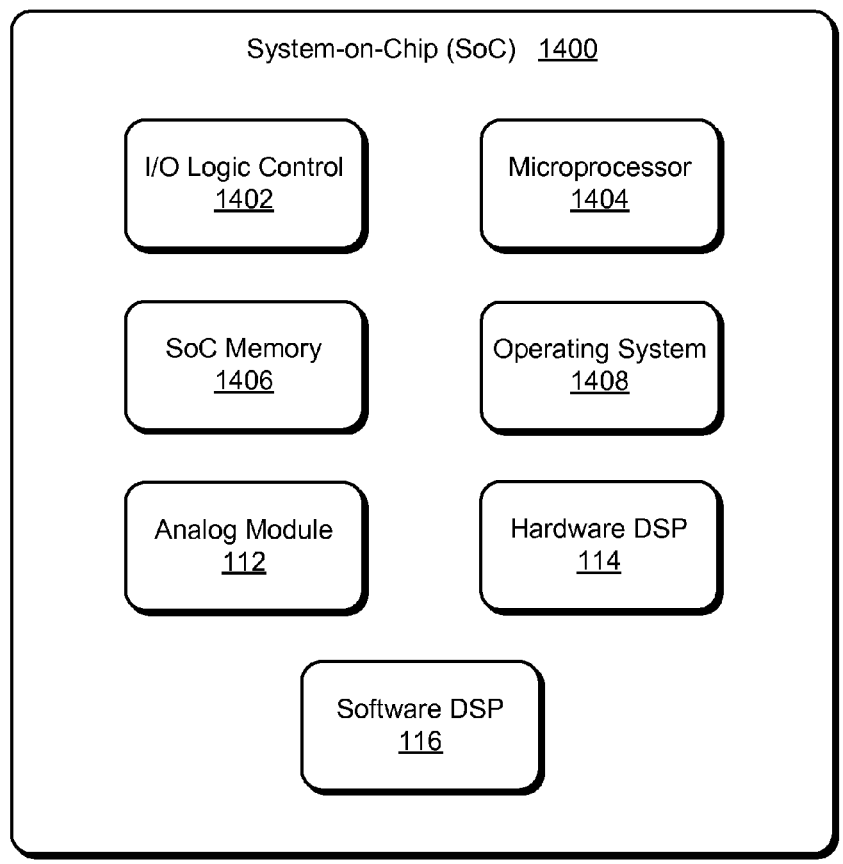
FIG. 14 illustrates a System-on-Chip that is capable of implementing portions of a touchscreen system of FIG. 2.

As noted above, the described techniques can be performed with an integrated hardware chip having a hardware DSP 114 and/or software DSP 116 as well as implement components of the analog module 112. In some embodiments, however, the techniques can be performed with other apparatuses, such as a system-on-chip, in whole or in part. FIG. 14 illustrates such a case, with an example System-on-Chip (SoC) 1400. An SoC can be implemented in a fixed or mobile device, such as any one or combination of a computer device, television set-top box, video processing and/or rendering device, Ethernet interface, switch, appliance device, gaming device, electronic device, vehicle, and/or workstation.

SoC 1400 can be integrated with electronic circuitry, a microprocessor, memory, input-output (I/O) logic control, communication interfaces and components, other hardware, firmware, and/or software needed to run an entire device. SoC 1400 can also include an integrated data bus (not shown) that couples the various components of the SoC for data communication between the components. A device that includes SoC 1400 can also be implemented with many combinations of differing components.

In this example, SoC 1400 includes various components such as an input-output (I/O) logic control 1402 (e.g., to include electronic circuitry) and a microprocessor 1404 (e.g., any of a microcontroller or digital signal processor). SoC 1400 also includes SoC memory 1406, which can be any type of random access memory (RAM), a low-latency nonvolatile memory (e.g., flash memory), read only memory (ROM), and/or other suitable electronic data storage. SoC memory 1406 may be separate from (shown) or integrated with (not shown) memory 110 depending on the architecture of SoC 1400. SoC 1400 can also include various firmware and/or software, such as an operating system 1408, which can be computer-executable instructions maintained by SoC memory 1406 and executed by microprocessor 1404. SoC 1400 can also include other various communication interfaces and components, wireless LAN (WLAN) or PAN (WPAN) components, other hardware, firmware, and/or software.

SoC 1400 may include part of the analog module 112, hardware DSP 114, and/or software DSP 116 of FIG. 1. These entities and their corresponding functionality are described with reference to the respective components of the example environment 100 shown in FIG. 1.

Although the subject matter has been described in language specific to structural features and/or methodological techniques and/or acts, it is to be understood that the subject matter defined in the appended claims is not necessarily limited to the specific features, techniques, or acts described above, including orders in which they are performed.

What is claimed is:

1. A touchscreen system comprising:
an analog module configured to detect proximity of an object to a display device using one or more sensors;
a hardware digital signal processor configured to process an output of the analog module using one or more algorithms at least one of which is a voting algorithm; and
a digital signal processor configured to implement software to detect one or more touch behaviors by processing an output of the hardware digital signal processor.

2. The touchscreen system as recited in claim 1, wherein the one or more sensors are configured to detect the proximity of the object using capacitance.

3. The touchscreen system as recited in claim 1, wherein at least one of the one or more algorithms of the hardware digital signal processor is configured to adaptively calibrate voltage drift of the one or more sensors.

4. The touchscreen system as recited in claim 1, wherein at least one of the one or more algorithms of the hardware digital signal processor is configured to employ filtering and grouping techniques to the output of the analog module.

5. The touchscreen system as recited in claim 4, wherein the filtering and grouping is configured to increase detection sensitivity of the output of the analog module.

6. The touchscreen system as recited in claim 1, wherein the voting algorithm of the hardware digital signal processor is configured to use a voting window.

7. The touchscreen system as recited in claim 6, wherein the use of the voting window is configured to reduce a burst error in the output of the analog module.

8. The touchscreen system as recited in claim 1, wherein at least one of the one or more algorithms of the hardware digital signal processor is configured to generate a trace-tracking table that describes proximity of the object to one or more locations of the display device.

9. The touchscreen system as recited in claim 8, wherein at least one of the one or more algorithms of the hardware digital signal processor is configured to generate a second trace-tracking table that describes proximity of a second object to the display device to one or more locations.

10. The touchscreen system as recited in claim 1, wherein at least one of the one or more algorithms of the hardware digital signal processor is configured to determine an on state of a location of at least one of the one or more sensors using a detection threshold and a noise threshold.

11. The touchscreen system as recited in claim 1, wherein the digital signal processor configured to implement software is also configured to expose the detected one or more touch behaviors to one or more applications of a computing device that includes the touchscreen system.

12. The touchscreen system as recited in claim 1, wherein the hardware digital signal processor is configured to implement the one or more algorithms without using software.

13. A method comprising:
detecting proximity of an object to a display device using one or more sensors of an analog module;
converting an output of the analog module into a digital signal by an analog-digital conversion module;
processing the digital signal using one or more algorithms of a hardware digital signal processor at least one of which is a voting algorithm; and
detecting one or more touch behaviors from the processed digital signal by a digital signal processor using software.

14. The method as recited in claim 13, wherein at least one of the one or more algorithms of the hardware digital signal processor is configured to adaptively calibrate voltage drift of the one or more sensors, the one or more sensors configured to detect the proximity using capacitance.

15. The method as recited in claim 13, wherein at least one of the one or more algorithms of the hardware digital signal processor is configured to employ filtering and grouping on the digital signal to increase detection sensitivity of the proximity of the object.

16. The method as recited in claim 13, wherein at least one of the one or more algorithms of the hardware digital signal processor is configured to use a voting window on the digital signal to reduce a burst error.

17. The method as recited in claim 13, wherein at least one of the one or more algorithms of the hardware digital signal processor is configured to generate:
a first trace-tracking table that describes proximity of the object to one or more locations of the display device; and
a second trace-tracking table that describes proximity of a second object to one or more locations the display device.

18. An integrated hardware chip comprising:
a hardware digital signal processor configured to process a signal using one or more algorithms at least one of which is a voting algorithm, the signal describing proximity of an object to a display device detected using one or more sensors; and a digital signal processor configured to implement software to process an output of the hardware digital signal processor to detect one or more touch behaviors.

19. The integrated hardware chip as recited in claim 18, wherein the one or more algorithms of the hardware digital signal processor are configured to:
adaptively calibrate voltage drift of the one or more sensors, the one or more sensors configured to detect the proximity using capacitance;
employ filtering and grouping to increase detection sensitivity of the proximity of the object;
use a voting window of the voting algorithm on the digital signal to reduce a burst error; or
generate a first trace-tracking table that describes proximity of the object to one or more locations of the display device and a second trace-tracking table that describes proximity of a second object to one or more locations the display device.

20. The integrated hardware chip as recited in claim 18, wherein the digital signal processor configured to implement software is also configured to expose the detected one or more touch behaviors.

\* \* \* \* \*